United States Patent [19]

Seshamani

[11] Patent Number: 4,615,715

[45] Date of Patent: Oct. 7, 1986

[54] WATER-COOLED CYCLONE SEPARATOR

[75] Inventor: Venkatraman Seshamani, Gillette, N.J.

[73] Assignee: Foster Wheeler Energy Corporation, Livingston, N.J.

[21] Appl. No.: 712,954

[22] Filed: Mar. 15, 1985

[51] Int. Cl.[4] .............................................. B01D 53/24

[52] U.S. Cl. ....................................................... 55/269

[58] Field of Search ...................... 55/269, 435, 459 R

[56] References Cited

U.S. PATENT DOCUMENTS 3,327,456 6/1967 Guber et al. .......................... 55/269

3,443,360 5/1969 Reeves .............................. 55/269 X 3,470,678 10/1969 Clark et al. ........................... 55/269

4,125,385 11/1978 Rado et al. ............................ 55/269

FOREIGN PATENT DOCUMENTS 0026069 2/1977 Japan .................................... 55/269

0997831 2/1983 U.S.S.R. .......................... 55/459 R

*Primary Examiner*—Charles Hart

*Attorney, Agent, or Firm*—Marvin A. Naigur; John E. Wilson; Warren B. Kice

[57] ABSTRACT

A cyclone separator in which a pair of tubular members are disposed in a coaxially spaced relationship to define an annular chamber for receiving gases having solid particles entrained therein. The gases and particles swirl around in the annular chamber to separate the particles from the gases by centrifugal forces. The particles are collected in a hopper and the gases pass upwardly through the separator to external equipment. An enclosure extends around the outer tubular member and is formed by a plurality of parallel water wall tubes for circulating water around the annular chamber to reduce heat losses and minimize the requirements for internal insulation.

7 Claims, 4 Drawing Figures

WATER-COOLED CYCLONE SEPARATOR

BACKGROUND OF THE INVENTION

This invention relates to a cyclone separator and, more particularly, to such a separator for separating solid particles from gases discharged from a fluidized bed combustion system.

Fluidized bed reactors, usually in the form of combustors, boilers, gasifiers, or steam generators, are well known. In a normal fluidized bed arrangement, air is passed through a perforated plate, or grate, which supports a bed of particulate material, usually including a mixture of fuel material, such as high sulfur bituminous coal, and an absorbent material for the sulfur released as a result of the combustion of the coal. As a result of the air passing through the bed, the bed behaves like a boiling liquid which promotes the combustion of the fuel. In addition to considerably reducing the amount of sulfur-containing gases introduced to the atmosphere, such an arrangement permits relatively high heat transfer rates per unit size, substantially uniform bed temperatures, relatively low combustion temperatures, and reduction in corrosion and boiler fouling.

In the fluidized bed combustion process, the fluidizing air, after passing through the bed, combines with the products of combustion and rises above the level of the fluidized bed to a freeboard area, and in so doing, entrains a substantial amount of relatively fine solid particles from the fluidized bed. Of the various techniques that have evolved for separating the entrained solid particles from the mixture of air and gases, the cyclone separator is the most popular. In these arrangements the mixture of air and gases with the entrained particles are swirled in an annular chamber to separate the particles from the mixture by centrifugal forces.

Conventional cyclone separators are normally provided with a monolithic external refractory wall which is abrasion resistant and insulative so that the outer casing runs relatively cool. Typically, the wall of a conventional separator is formed by an insulative refractory material sandwiched between an inner hard refractory material and an outer metal casing. In order to achieve proper insulation, the thickness of these layers must be relatively large which adds to the bulk, weight, and cost of the separator. Also, the outside metal casing cannot be further insulated from the outside since to do so could raise its temperature as high as 1500° F. which is far in excess of the maximum temperature it can tolerate. Further, most conventional cyclone separators require relatively expensive, high temperature, refractory-lined ductwork and expansion joints between the reactor and the cyclone, and between the cyclone and the heat recovery section, which are fairly sophisticated and expensive. Still further, conventional separators formed in the above manner require a relatively long time to heat up before going online to eliminate premature cracking of the refractory walls. This, of course, is inconvenient and adds to the cost of the process.

SUMMARY OF THE INVENTION

It is therefore an objective of the present invention to provide a cyclone separator which eliminates the requirement for a relatively large amount of internal refractory material for insulation.

It is a still further object of the present invention to provide a cyclone separator of the above type which has a considerably reduced bulk and weight, and a lower cost, when compared to conventional separators.

It is a still further object of the present invention to provide a cyclone separator of the above type which eliminates the need for expensive high temperature refractory-lined ductwork and expansion joints between the furnace and cyclone separator and between the later and the heat recovery section.

It is a still further object of the present invention to provide a cyclone separator of the above type which can immediately be put into use without any warm-up period.

It is a still further object of the present invention to provide a cyclone separator of the above type in which the temperature of the outer walls of the separator can be maintained the same as the temperature of the walls of the adjoining reactor.

Toward the fulfillment of these and other objects, the separator of the present invention includes a pair of tubular members disposed in a coaxially spaced relationship to define an annular chamber for receiving gases having solid particles entrained therein. The gases and particles swirl around in the annular chamber to separate same by centrifugal forces. The solid particles are collected in a hopper and the gases pass upwardly through the separator to external equipment. An enclosure extends around the outer tubular member and is formed by a plurality of parallel waterwall tubes for circulating water around the annular chamber to reduce heat losses and minimize the requirements for internal insulation.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
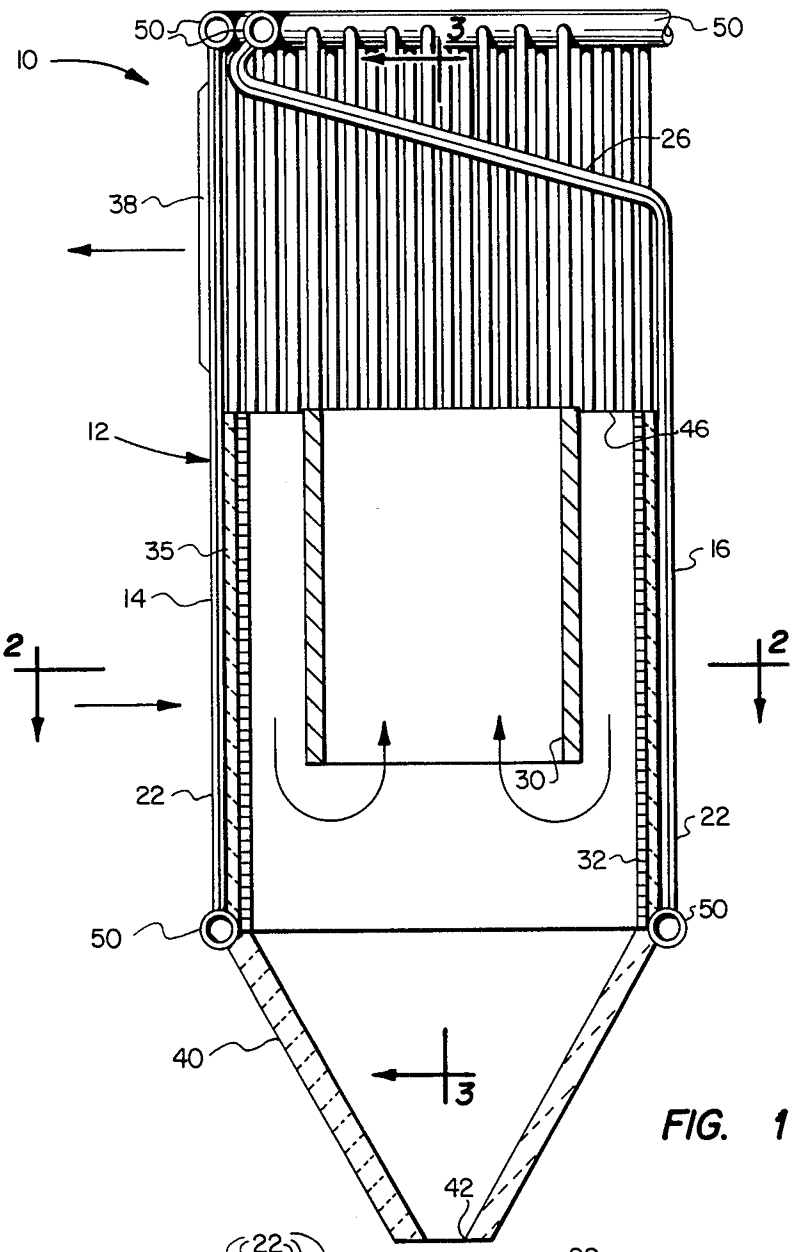
FIG. 1 is a longitudinal cross-sectional view of the cyclone separator of the present invention.
Figure 2:
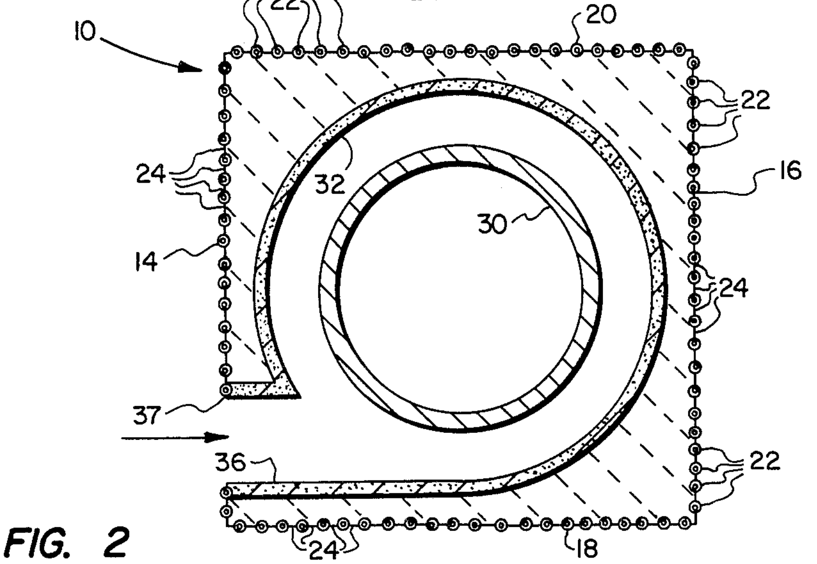
FIG. 2 is a cross-sectional view taken along the line 2—2 of FIG. 1.

Referring to FIGS. 1 and 2 of the drawings, the reference numeral 10 refers in general to the cyclone separator of the present invention which consists of an enclosure 12 having a front wall 14, a rear wall 16, and two side walls 18 and 20. Each of these walls is formed by a plurality of vertically extending, spaced, parallel steel tubes 22 (FIG. 2) and a plurality of fins 24 respectively extending between adjacent tubes 22 to form a gas-tight structure having a rectangular cross section. The enclosure 12 includes a roof 26 (FIG. 1) which is formed by bending a plurality of tubes 22 forming the rear wall 16 towards the front wall 14.

A pair of coaxially disposed tubular members 30 and 32 are disposed within the enclosure 12 with the outer tubular member 32 extending in a spaced relation to the inner surface of the walls 14, 16, 18, and 20. The inner tubular member 30 extends in a spaced relation to the outer tubular member 32 to define an annular chamber 34.

The inner tubular member 30 is formed from a cast alloy, such as stainless steel, coated on its outer surface with a silicon carbide. The outer tubular member 32 is formed by a plurality of tongue and grooved bricks made of silicon carbide, or a similar abrasion resistant material. The space between the outer tubular member 32 and the walls 14, 16, 18, and 20 is filled with a light weight castable filler 35 of any convention type.

An inlet 36 (FIG. 2) extends through a portion of the outer tubular member 32 and registers with an opening 37 formed in the front wall 14 of the enclosure 12. The inlet 36 extends tangentially with respect to the annular chamber 34. As outlet 38 is formed in the front wall 14 by bending portions of a selected number of tubes 22 out of the plane of the wall and removing the fins between these latter tube portions to form a screen-like opening. A refractory lined hopper 40 is connected to the lower end of the outer tubular member 32 and has a discharge opening 42 formed at its lower end for reasons that will be described later.

Figure 3:
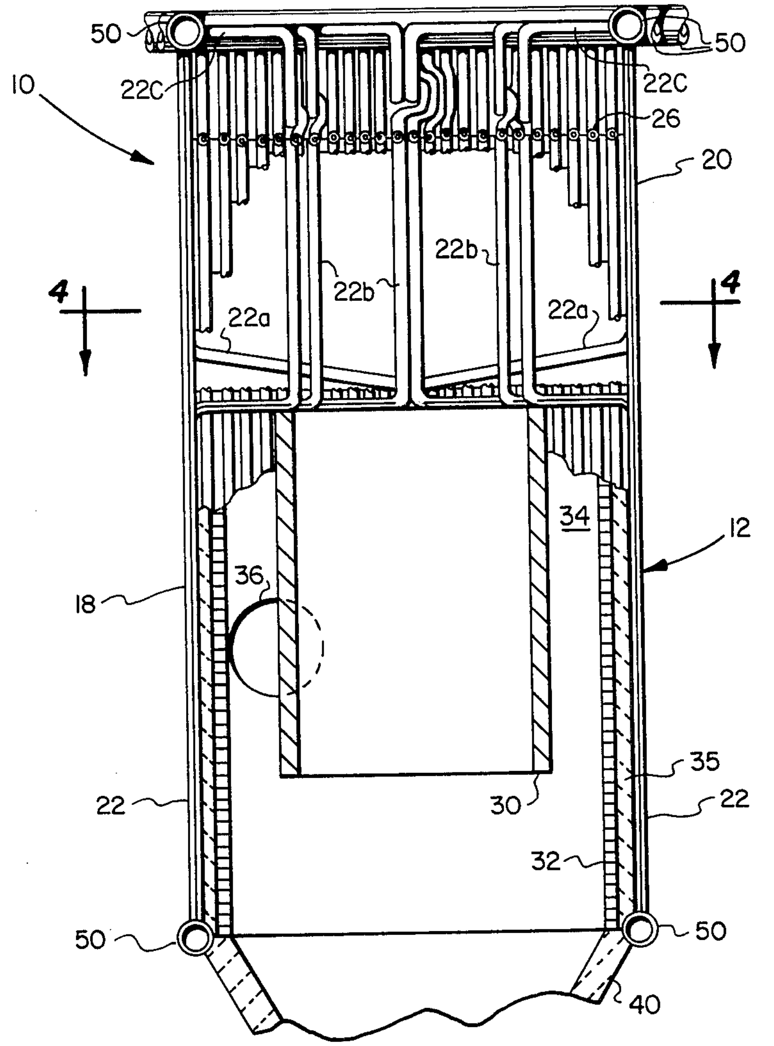
FIG. 3 is a cross-sectional view taken along the line 3—3 of FIG. 1.
Figure 4:
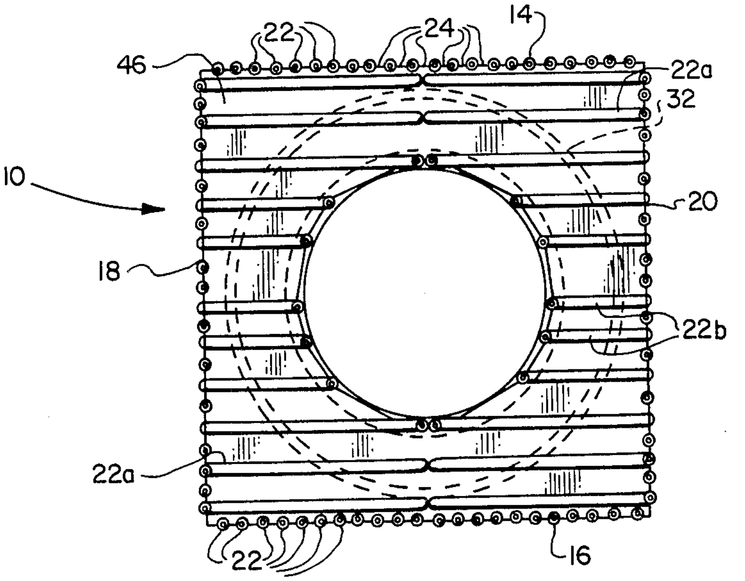
FIG. 4 is a cross-sectional view taken along the line 4—4 of FIG. 3.

As shown in FIGS. 1, 3 and 4, the portions of approximately every other tube 22 forming the side walls 18 and 20 of the enclosure 12 immediately above the upper ends of the tubular members 30 and 32 are bent inwardly and are provided with fins 22 to form a sub-roof, or cover, 46 extending in the space between the walls 14, 16, 18, and 20, and the inner tubular member 30. Those portions of the tubes 22 bent inwardly and not enclosing the inner tubular member 30 are bent back toward their respective walls 18 or 20 to form a U-shape section **22*a* (FIG. 3) which rests on the upward end of the tubular member 30**.

Those portions of the tubes 22 bent inwardly and enclosing the tubular member 30 are also bent upwardly to form vertical sections **22*b* which extends to the top of the cyclone separator 10. The upper portion of these tubes are bent again to form horizontal sections 22*c* extending back to their respective wall 18 or 20. The vertical extending tube sections 22*b* are connected between the upper end of the inner tubular member 30 and a top support (not shown) to locate and support the inner tubular member in the position shown. The spaces created in the upper portions of the walls 18 and 20 by the absence of the tube sections 22*a*, 22*b*, and 22*c*** are filled in by additional, or wider, fins extending between the tubes remaining in the latter wall sections.

A plurality of headers 50 are disposed at the ends of the tubes 22 forming the walls 14, 16, 18, and 20 and the roof 26 to permit circulation of water and steam through the tubes. It is understood that the headers 50 can be connected in a manner to form a portion of the entire watersteam flow circuit that includes the water and steam from the reactor disposed adjacent the cyclone separator 10.

It is also understood that the outer surfaces of the walls 14, 16, 18, and 20 can be covered with a minimal amount of insulation which can be the same material as the aforementioned reactor, which normally would include a relatively thin (approximately 2 inches) layer of mineral wool insulation extending between the walls and a metal lagging. For the convenience of presentation this is not shown in the drawings.

In operation, the inlet 36 receives hot gases from a fluidized bed reactor, or the like (not shown), disposed adjacent the cyclone separator 10, which gases contain entrained fine particle fuel and absorbent material from the fluidized bed. The gases containing the fine particulate material thus swirl around the annular chamber 34 and the solid particles entrained in the gases are propelled by centrifugal forces against the inner wall of the outer tubular member 32 where they collect and fall downwardly by gravity, all in a conventional manner.

The relatively clean gases in the annular chamber 34 are prevented from flowing upwardly by the cover 46 and thus pass downwardly where they exit the annular chamber and then pass upwardly, by internal convection, through the inner tubular member 30 before exiting the enclosure 12 through the outlet 38 formed in the front wall 14. The hopper 40 receives the separated particulate material from the inner wall of the outer tubular member 32 and discharges same through the outlet 42 to external equipment for further processing.

Several advantages result from the foregoing arrangement. For example, the cyclone separator of the present invention reduces heat losses and minimizes the requirement for internal refractory insulation. Also, the bulk, weight, and cost of the separator of the present invention is much less than that of conventional separators. The separator of the present invention also eliminates the need for expensive high temperature refractory-lined ductwork and expansion joints between the furnace and cyclone separator, and between the later and the heat recovery section.

Further, the cyclone separator of the present invention can be put into use relatively quickly without any warm-up period. Still further, the temperature of the outer walls of the separator of the present invention can be maintained the same as the temperature of the walls of the adjoining reactor.

It is understood that several variations may be made in the foregoing without departing from the scope of the invention. For example, inner tubular member 30 can be eliminated, and the mixture of gases and air with the entrained solid particles can be introduced, via the inlet 36, directly into the interior of the circular chamber defined by outer tubular member 32 where they pass circumferentially around the interior wall of the circular chamber, to achieve the aforementioned separation.

A latitude of modification, change and substitution is intended in the foregoing dislosure and in some instances some features of the invention will be employed without a corresponding use of other features. Accordingly, it is appropriate that the appended claims be construed broadly and in a manner consistent with the spirit and scope of the invention therein.

What is claimed is:

1. A cyclone separator comprising an inner tube, an outer tube extending around said inner tube in a coaxial relationship to define an annular chamber, the outer surface of said inner tube and the inner surface of said outer tube each having an abrasion resistance surface, an inlet opening extending through said outer tube and in a tangential relationship to said annular chamber whereby gases containing solid particles entering said inlet opening are directed through said annular space to separate the solid particles from said gases by centrifugal forces, means disposed below said annular chamber for collecting said solid particles, means for directing said gases towards the interior of said inner tube where they pass upwardly through said tube and exit from the upper end thereof, an enclosure extending around said outer tube in a spaced relationship to said outer tube and formed by a plurality of parallel tubes cooled by circulating water or steam to reduce heat losses and minimize the need for interal insulation and a castable material disposed in said space between said outer tube and said enclosure.

2. The separator of claim 1 wherein said tubes forming said enclosure are spaced apart and further comprising an elongated fin extending between adjacent tubes and attached to said adjacent tubes to form an airtight wall.

3. The separator of claim 1 wherein said enclosure has a rectangular cross section.

4. The separator of claim 1 wherein said collecting means is in the form of a hopper extending from the lower end of said outer tube.

5. The separator of claim 1 wherein the upper end portions of a portion of said enclosure tubes are bent in a manner to extend to the upper end of said inner tube and back to the plane of said enclosure wall to bridge the upper end portion of said annular chamber and thus form said directing means.

6. The separator of claim 1 wherein the abrasion resistant surface of said outer tube is formed from interlocking abrasive resistant bricks.

7. The separator of claim 1 wherein the upper end portions of a portion of said enclosure tubes are bent in a manner to extend to the upper end of said inner tube and back to the plane of said enclosure wall to bridge the upper end portion of said annular chamber and thus form said concentric circular opening.

* * * * *

UNITED STATES PATENT AND TRADEMARK OFFICE

CERTIFICATE OF CORRECTION

PATENT NO. : 4,615,715

DATED : October 7, 1986

INVENTOR(S) : Venkatraman Seshamani

It is certified that error appears in the above-identified patent and that said Letters Patent is hereby corrected as shown below:

Claim 1, column 5, line 2, change "interal" to -- internal --.

Signed and Sealed this

Thirteenth Day of March, 1990

*Attest:*

JEFFREY M. SAMUELS

*Attesting Officer*

*Acting Commissioner of Patents and Trademarks*